(12) United States Patent
Kuroda

(10) Patent No.: US 10,836,228 B2
(45) Date of Patent: Nov. 17, 2020

(54) BALL JOINT, AND STABILIZER LINK USING SAME

(71) Applicant: NHK SPRING CO., LTD., Kanagawa (JP)

(72) Inventor: Shigeru Kuroda, Kanagawa (JP)

(73) Assignee: NHK SPRING CO., LTD. (JP)

( * ) Notice: Subject to any disclaimer, the term of this patent is extended or adjusted under 35 U.S.C. 154(b) by 156 days.

(21) Appl. No.: 16/084,555

(22) PCT Filed: Mar. 16, 2017

(86) PCT No.: PCT/JP2017/010788
§ 371 (c)(1),
(2) Date: Sep. 12, 2018

(87) PCT Pub. No.: WO2017/159822
PCT Pub. Date: Sep. 21, 2017

(65) Prior Publication Data
US 2019/0077208 A1    Mar. 14, 2019

(30) Foreign Application Priority Data

Mar. 17, 2016 (JP) ................................. 2016-053571

(51) Int. Cl.
*B60G 7/00* (2006.01)
*F16C 11/06* (2006.01)
(Continued)

(52) U.S. Cl.
CPC .......... *B60G 7/005* (2013.01); *B29C 45/1671* (2013.01); *B60G 7/00* (2013.01);
(Continued)

(58) Field of Classification Search
CPC .. B60G 7/00; B60G 7/005; B60G 2204/1224; B60G 2204/416; B60G 21/0551;
(Continued)

(56) References Cited

U.S. PATENT DOCUMENTS 5,009,538 A * 4/1991 Shirai .................... F16C 7/026
403/122
5,092,703 A   3/1992 Kobayashi
(Continued)

FOREIGN PATENT DOCUMENTS

EP    1310344 A1    5/2003
EP    2428344 A1    3/2012
(Continued)

OTHER PUBLICATIONS

Original Notification for Reasons for Refusal issued in Japanese priority patent application No. JP 2016-053571, dated Feb. 7, 2017.
(Continued)

*Primary Examiner* — Laura Freedman
(74) *Attorney, Agent, or Firm* — Day Pitney LLP

(57) ABSTRACT

This ball joint is provided with: a ball stud, one end being fastened to a suspension device/stabilizer, and the other end having a ball part; a housing that rotatably supports the ball part of the ball stud; and a ball seat provided so as to be interposed between the housing and the ball part, the ball seat having an inner spherical part for accommodating the ball part. The ball seat is provided to the housing by insert injection molding. The inside diameter dimension of the inner spherical part formed by separate injection molding is set to a dimension corresponding to the anticipated amount of molding shrinkage of the resin during the insert injection molding.

6 Claims, 8 Drawing Sheets

(51) Int. Cl.
*B29C 45/16* (2006.01)
*B62D 7/16* (2006.01)
*B29C 45/14* (2006.01)
*B29L 31/04* (2006.01)
*B29K 105/02* (2006.01)

(52) U.S. Cl.
CPC .............. *B62D 7/16* (2013.01); *F16C 11/068* (2013.01); *F16C 11/0619* (2013.01); *F16C 11/0638* (2013.01); *F16C 11/0647* (2013.01); *F16C 11/0657* (2013.01); *F16C 11/0685* (2013.01); *F16C 11/0695* (2013.01); *B29C 45/14754* (2013.01); *B29C 2045/14762* (2013.01); *B29K 2105/02* (2013.01); *B29K 2995/0049* (2013.01); *B29L 2031/04* (2013.01); *F16C 2326/24* (2013.01)

(58) Field of Classification Search
CPC . B60G 2206/81012; B62D 7/16; F16C 11/06; F16C 11/0619; F16C 11/0638; F16C 11/0647; F16C 11/0657; F16C 11/068; F16C 11/0685; F16C 11/0695; F16C 2326/24; B29C 45/14754; B29C 45/1671; B29C 2045/14762; B29K 2105/02; B29K 2995/0049; B29L 2031/04
See application file for complete search history.

(56) References Cited

U.S. PATENT DOCUMENTS

| | | | |
|---|---|---|---|
| 5,641,235 A | 6/1997 | Maughan et al. | |
| 5,697,142 A | 12/1997 | Sugiura | |
| 5,743,669 A * | 4/1998 | Fujita | F16C 11/0633 29/898.051 |
| 5,795,092 A * | 8/1998 | Jaworski | B60G 7/003 403/133 |
| 5,860,757 A * | 1/1999 | Sugiura | F16C 11/0633 403/131 |
| 6,109,816 A | 8/2000 | Iwasaki | |
| 6,139,788 A * | 10/2000 | Dorr | B29C 45/14467 264/263 |
| 6,254,114 B1 * | 7/2001 | Pulling | B60G 7/005 280/93.511 |
| 6,398,446 B1 * | 6/2002 | Pazdirek | B60G 7/001 403/122 |
| 8,550,741 B2 * | 10/2013 | Kuroda | F16C 11/0685 403/132 |
| 10,220,666 B2 * | 3/2019 | Kuroda | B60G 21/055 |
| 2003/0086753 A1 | 5/2003 | Trotter et al. | |
| 2005/0123345 A1 | 6/2005 | Trotter et al. | |
| 2012/0025416 A1 | 2/2012 | Kim | |
| 2013/0147148 A1 | 6/2013 | Kuroda | |
| 2013/0285269 A1 | 10/2013 | Kim | |
| 2014/0131970 A1 | 5/2014 | Kuroda | |
| 2019/0032702 A1 * | 1/2019 | Kuroda | F16C 11/0685 |
| 2019/0070920 A1 * | 3/2019 | Kuroda | F16C 11/0638 |
| 2019/0217679 A1 * | 7/2019 | Kuroda | B60G 21/0551 |

FOREIGN PATENT DOCUMENTS

| | | |
|---|---|---|
| JP | S58-146714 A | 9/1983 |
| JP | H03-009113 A | 1/1991 |
| JP | H03-213711 A | 9/1991 |
| JP | H05-045226 U | 6/1993 |
| JP | H08-82318 A | 3/1996 |
| JP | H10-151931 A | 6/1998 |
| JP | 2002-181029 A | 6/2002 |
| JP | 2005-061537 A | 3/2005 |
| JP | 2006-292094 A | 10/2006 |
| JP | 2011-027237 A | 2/2011 |
| JP | 2012-041013 A | 3/2012 |
| JP | 2012-106692 A | 6/2012 |
| JP | 2013-002597 A | 1/2013 |
| JP | 2015-152153 A | 8/2015 |
| JP | 2015-529318 A | 10/2015 |

OTHER PUBLICATIONS

English translation of Notification for Reasons for Refusal issued in Japanese priority patent application No. JP 2016-053571, dated Feb. 7, 2017.
Original International Search Report issued in corresponding international application No. PCT/JP2017/010788, dated Jun. 13, 2017.
English translation of International Search Report issued in corresponding international application No. PCT/JP2017/010788, dated Jun. 13, 2017.
Original Written Opinion of the International Searching Authority issued in corresponding international application No. PCT/JP2017/010788, dated Jun. 13, 2017.
English translation of the Written Opinion of the International Searching Authority issued in corresponding international application No. PCT/JP2017/010788, dated Jun. 13, 2017.
Supplementary European Search Report issued in corresponding European patent application No. EP 17 76 6817, dated Oct. 8, 2019.

* cited by examiner

BALL JOINT, AND STABILIZER LINK USING SAME

CROSS-REFERENCE TO RELATED APPLICATIONS

This application is a U.S. National Stage Application under 35 U.S.C. § 371 of International Application No. PCT/JP2017/010788, filed on 16 Mar. 2017, and published on 21 Sep. 2017, as WO 2017/159822 A1, which claims the benefit of priority to Japanese Patent Application No. JP 2016-053571, filed on 17 Mar. 2016. The content of each of the above referenced patent applications is incorporated herein by reference in its entirety for any purpose whatsoever.

TECHNICAL FIELD

The present invention relates to a ball joint to be used in a linking part for linking mechanism elements together, or the like, and a stabilizer using the same.

BACKGROUND ART

A vehicle is equipped with suspensions for absorbing and damping impacts and vibrations which are transmitted to a vehicle body from road surfaces via wheels, and a stabilizer for increasing roll stiffness of the vehicle body. Bar-shaped members called a stabilizer link are used in the vehicle for the purpose of smoothly linking the suspensions and the stabilizer together. Each stabilizer link includes a support bar, and ball joints provided respectively to the two end portions of the support bar, for example, as shown in Patent Literature 1.

A ball joint according to Patent Literature 1 includes: a ball stud including a sphere part (hereinafter referred to as a "ball part"); and a housing, provided to the two ends of a support bar, for turnably housing the ball part of the ball stud. A resin-made ball seat is provided inside the housing such that the ball seat exists between an inner wall of the housing and the ball part of the ball stud. The ball part housed in the housing slides over the housing with an outer circumferential surface of the ball part remaining in contact with an inner circumferential surface of the ball seat. This allows the ball stud to tilt freely. The ball joints included in the stabilizer link thus link the suspension and the stabilizer smoothly.

The ball joint according to Japanese Patent Application Publication No. 2015-152153 is capable of appropriately managing torque which causes the ball part to slide over the housing.

SUMMARY OF INVENTION

Technical Problem

In the ball joint according to Patent Literature 1, a main body part of the resin-made ball seat is fixed to the housing by thermal tightening.

In this respect, let us assume a case where the ball seat is fixed to the housing by insert injection molding where the resin (from which to mold the housing) is injected into a mold with the ball seat (and the support bar) inserted in the mold while the ball part of the ball stud is being held in the ball seat, instead of by heat-staking. In such a case, after the insert injection molding, the housing suffers from molding shrinkage (a phenomenon where the volume of the resin injected into the mold shrinks after the resin is cooled), and accordingly constricts the ball part of the ball stud (with the ball seat interposed in between). Thus, there is likelihood that the ball joint has difficulty in appropriately managing the torque which causes the ball part to slide over the housing.

The present invention has been made with the above situation taken into consideration. An object of the present invention is to provide: a ball joint capable of appropriately managing torque which causes a ball part to slide over a hosing, even in a case where a ball seat is provided in the housing by insert injection molding where resin is injected into a mold with the ball seat inserted in the mold while the ball part of the ball stud is being held in the ball seat; and a stabilizer link using the ball joint.

Solution to Problem

To solve the above problems, a ball joint according to the present invention (1) is a ball joint having the most essential characteristics described below. The ball joint includes: a ball stud fastened at one end to a structure body, and including a ball part at an opposite end; a housing turnably supporting the ball part of the ball stud; and a ball seat provided existing between the housing and the ball part, and including a holding part for the ball part. The ball seat is formed by injection molding where a thermoplastic first resin is injected into a first mold, and is provided in the housing by insert injection molding where a thermoplastic second resin from which to mold the housing is injected into a second mold with the ball seat inserted in the second mold while the ball part is being held in the holding part of the ball seat. An inner diameter dimension of the holding part formed in the ball seat by the injection molding is set at a dimension greater enough to accommodate an amount of molding shrinkage of the first resin after the injection molding, and an amount of molding shrinkage of the second resin after the insert injection molding, the amount of molding shrinkage depending on an injection temperature and an injection pressure of the second resin during the insert injection molding.

In the ball joint according to the present invention (1), the inner diameter dimension of the holding part formed in the ball seat by the injection molding is set at the dimension greater enough to accommodate the amount of molding shrinkage of the first resin after the injection molding, and the amount of molding shrinkage of the second resin after the insert injection molding, the amount of molding shrinkage depending on the injection temperature and the injection pressure of the second resin during the insert injection molding. For this reason, if the inner diameter dimension of the holding part included in the ball seat shrinks because of the molding shrinkage of the first resin after the injection molding, and the molding shrinkage of the second resin after the insert injection molding, the amount of molding shrinkage depending on the injection temperature and the injection pressure of the second resin, torque produced between the inner circumferential surface of the holding part and the outer circumferential surface of the ball part can be appropriately managed.

The ball joint according to the present invention (1) can appropriately manage the torque which causes the ball part to slide over the housing, even in the case where the ball seat is provided in the housing by the insert injection molding where the resin is injected into the mold with the ball seat inserted in the mold while the ball part of the ball stud is being held in the ball seat.

In addition, a ball joint according to the present invention (2) is the ball joint according to the present invention (1), characterized in that a material having a melting property which enables the material to withstand effects of the injection temperature and the injection pressure of the second resin during the insert injection molding is selected as the first resin from which to mold the ball seat to be formed by the injection molding.

In the ball joint according to the present invention (2), the material having the melting property which enables the material withstand the effects of the injection temperature and the injection pressure of the second resin during the insert injection molding is selected as the first resin from which to mold the ball seat to be formed by the injection molding. For this reason, even if the injection temperature and the injection pressure of the second resin affects the ball seat, the ball seat can be inhibited from becoming soft, and the torque produced between the inner circumferential surface of the holding part and the outer circumferential surface of the ball part can be appropriately managed.

The ball joint according to the present invention (2) can more appropriately manage the torque which causes the ball part to slide over the housing than the ball joint according to the present invention (1).

Furthermore, a ball joint according to the present invention (3) is the ball joint according to the present invention (1) or (2) characterized as follows. The ball seat covers at least more than half of the ball part including an area stretching between an apex part and an equatorial part of the ball part, and a flange part is formed throughout an area of the ball seat which includes an opening peripheral edge part. An inner diameter dimension of the opening peripheral edge part is set at a dimension less than the largest outer diameter dimension of the ball part. The largest outer diameter dimension of the flange part is set at a dimension greater than the largest outer diameter dimension of the ball part. A peripheral end edge of the flange part on a side of the apex part of the ball part extends vertically at least to a position where the peripheral end edge covers the equatorial part of the ball seat.

In the ball joint according to the present invention (3), the ball seat covers at least more than half of the ball part including the area stretching between the apex part and the equatorial part of the ball part; the opening peripheral edge part of the ball seat has a configuration which makes the opening peripheral edge part overhang the ball part; and the peripheral end edge of the flange part on the side of the apex part of the ball part extends vertically at least to the position where the peripheral end edge covers the equatorial part of the ball seat. The ball seat, therefore, can securely hold the ball part of the ball stud by surrounding a circumference of the ball part.

The ball joint according to the present invention (3) enables the ball part to smoothly slide over the housing with the ball seat interposed in between in addition of providing the same working and effects as the ball joint according to the present invention (1) or (2).

Moreover, a ball joint according to the present invention (4) is the ball joint according to any one of the present inventions (1) to (3), characterized in that a groove part extending along a meridian of the ball part is provided to an inner circumferential surface of the holding part of the ball seat, the inner circumferential surface facing the ball part.

In the ball joint according to the present invention (4), the groove part extending along the meridian of the ball part is provided to the inner circumferential surface of the holding part of the ball seat, the inner circumferential surface facing the ball part. The ball joint according to the present invention (4), therefore, enables the ball part to smoothly slide over the housing with the ball seat interposed in between by filling lubricant such as grease into the groove part.

The ball joint according to the present invention (4) enables the ball part to more smoothly slide over the housing with the ball seat interposed in between than the ball joint according to the present invention (3).

Besides, a ball joint according to the present invention (5) is the ball joint according to the present invention (4) characterized in that a lubricant chamber formed of a recessed portion capable of containing lubricant is provided to an inner bottom portion of the holding part of the ball seat, the inner bottom portion facing the apex part of the ball part.

In the ball joint according to the present invention (5), the lubricant chamber formed of the recessed portion capable of containing lubricant is provided to the inner bottom portion of the holding part of the ball seat, the inner bottom portion facing the apex part of the ball part. The ball joint according to the present invention (5), therefore, can contain lubricant which remains after filled into the groove part, and replenish the groove part with lubricant depending on the necessity.

The ball joint according to the present invention (5) can be expected to exert an effect of making the ball part much more smoothly slide over the housing with the ball seat interposed in between than the ball joint according to the present invention (4).

In addition, a ball joint according to the present invention (6) is the ball joint according to the present invention (5) characterized in that a bulge part capable of coming into contact with the apex part of the ball part is provided around a central portion of the lubricant chamber.

In the ball joint according to the present invention (6), the bulge part capable of coming into contact with the apex part of the ball part is provided around the central portion of the lubricant chamber. The ball joint according to the present invention (6), therefore, can facilitate an effect of replenishing the groove part with the lubricant which is contained in the lubricant chamber by allowing the ball part to turn with the apex part of the ball part in contact with the bulge part.

The ball joint according to the present invention (6) can be expected to exert the effect of making the ball part far more smoothly slide over the housing with the ball seat interposed in between than the ball joint according to the present invention (5).

Furthermore, a stabilizer link according to the present invention (7) is a stabilizer link, provided in a vehicle including a suspension and a stabilizer, for linking the suspension and the stabilizer together, characterized in that the stabilizer link includes the ball joint according to any one of the present inventions (1) to (6) which is provided to at least one longitudinal end portion of a bar-shaped support bar.

The stabilizer link according to the present invention (7) can realize the stabilizer link which brings about the working and effects of the ball joint according to any one of the present inventions (1) to (6).

Advantageous Effects of Invention

According to the present invention, the torque which causes the ball part to slide over the housing can be appropriately managed even in the case where the ball seat is provided in the housing by insert injection molding where the resin is injected into the mold with the ball seat inserted in the mold while the ball part of the ball stud is being held in the ball seat.

DESCRIPTION OF EMBODIMENTS

Detailed descriptions will be hereinbelow provided for a ball joint and a stabilizer link using the same according to an embodiment of the present by referring to the accompanying drawings depending to the necessity.

Stabilizer Link 11 According to an Embodiment of the Present Invention

Figure 1:
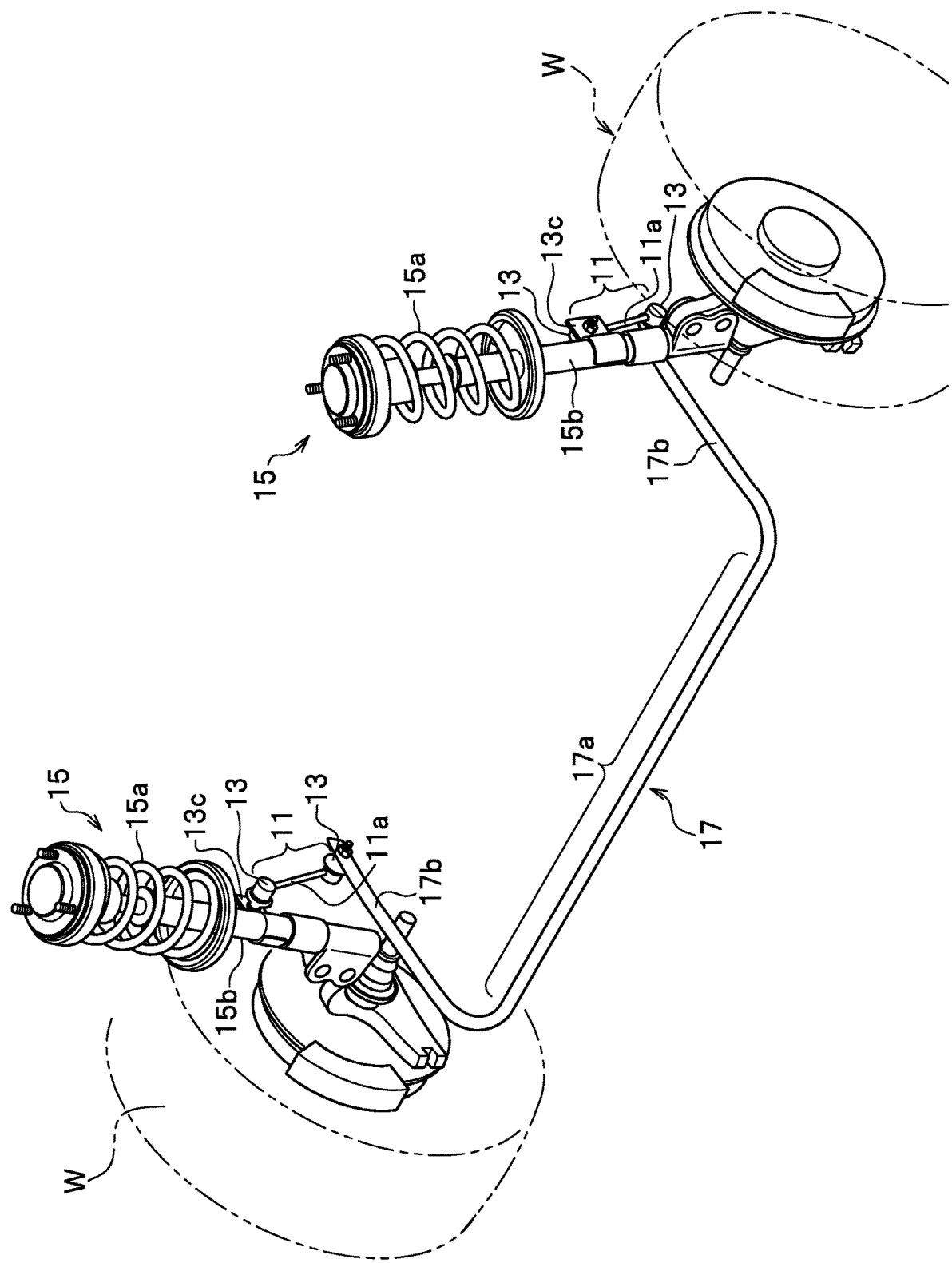
FIG. 1 is a perspective view illustrating how a stabilizer link according to an embodiment of the present invention is attached to a vehicle.

A stabilizer link 11 using a ball joint 13 according to the embodiment of the present invention will be described using an example where the stabilizer link 11 is attached to a vehicle. FIG. 1 is a perspective diagram illustrating how the stabilizer link 11 according to the embodiment of the present invention is attached to the vehicle.

As illustrated in FIG. 1, wheels W are mounted on a vehicle body of the vehicle (both omitted from FIG. 1) using suspensions 15. The suspensions 15 each include a coil spring 15a and a damper 15b in order to absorb and damp impacts and vibrations which is transmitted to the vehicle body from road surfaces via the wheels W.

As illustrated in FIG. 1, the left and right suspensions 15 are connected together using a stabilizer 17 which is substantially shaped like the letter U, and which is made from a spring steel bar or the like. The stabilizer 17 includes a torsion bar 17a extending between the left and right wheels W, and a pair of arm parts 17b bent and extending from the two respective end portions of the torsion bar 17a, for the purpose of increasing roll stiffness of the vehicle body and thereby inhibiting rolls of the vehicle. The suspensions 15 and the stabilizer 17 jointly correspond to a "structure body" of the present invention.

The stabilizer 17 is linked to each damper 15b supporting the corresponding wheel W using one stabilizer link 11. This linking is the same on the left and right wheel W sides. As illustrated in FIG. 1, each stabilizer link 11 includes a bar-shaped support bar 11 made from, for example, a steel pipe, and ball joints 13 provided to the two end portions of the support bar 11a. A distal end part 11a1 of the support bar 11a is plastically deformed into the shape of a flat plate by pressing.

It should be noted that the stabilizer link 11 according to the embodiment of the present invention is manufactured by insert injection molding where a resin (corresponding to a "second resin" of the present invention) from which to mold a housing 23 is injected into a mold (corresponding to a "second mold" of the present invention) with the support bar 11a and a ball stud 21 inserted in the mold at their respective predetermined positions. Incidentally, the term "insert injection molding" used in the following descriptions means the above process.

One of the pair of ball joints 13 is fastened and fixed to a distal end portion of the corresponding arm part 17b of the stabilizer 17, while the other of the pair of ball joints 13 is fastened and fixed to a bracket 15c of the corresponding damper 15b. Incidentally, the pair of ball joints 13 have the same configuration.

Ball Joint 13 According to the Embodiment of the Present Invention

Figure 2:
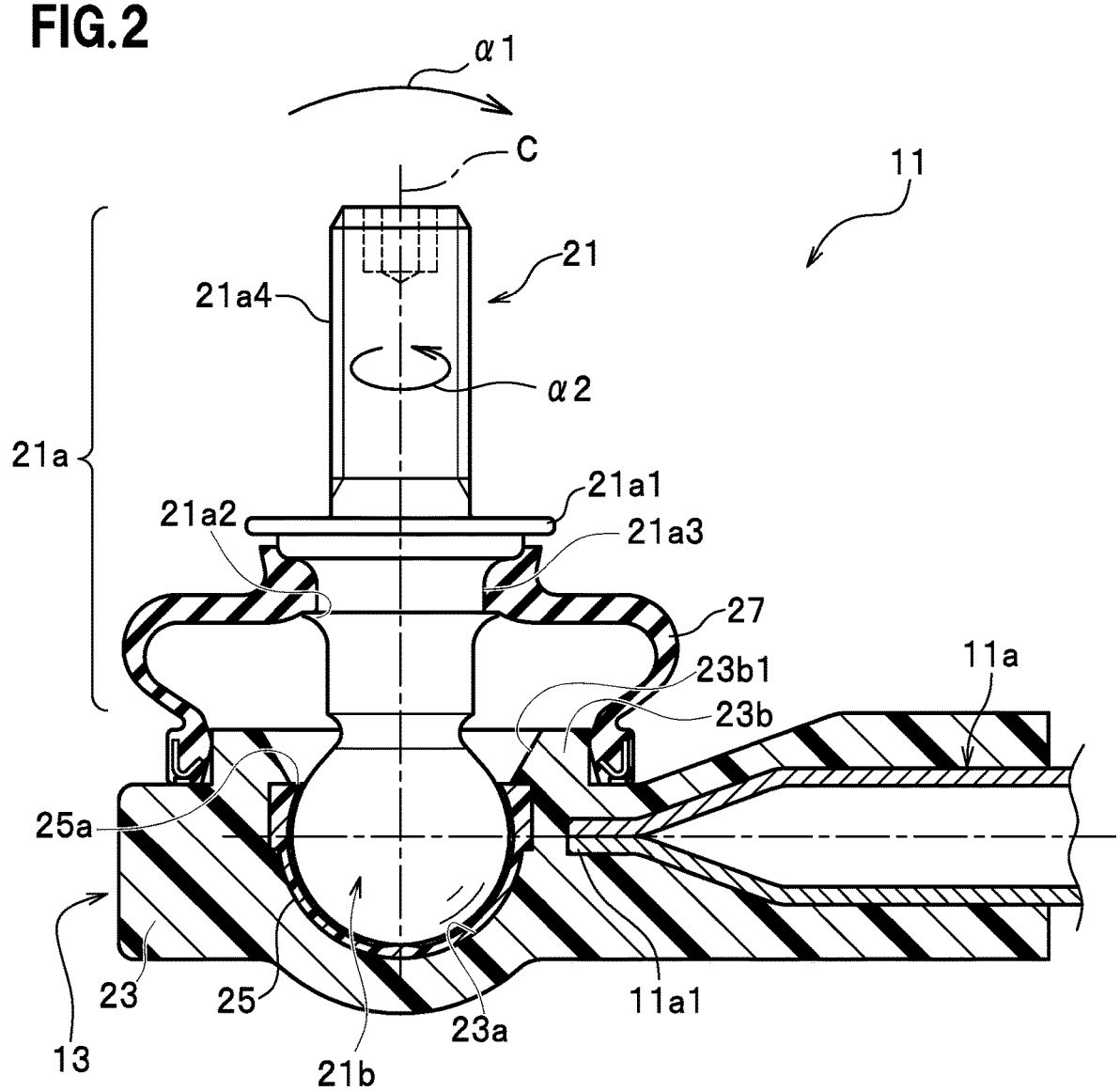
FIG. 2 is a vertical cross-sectional diagram of a ball joint according to the embodiment of the present invention.
Figure 3:
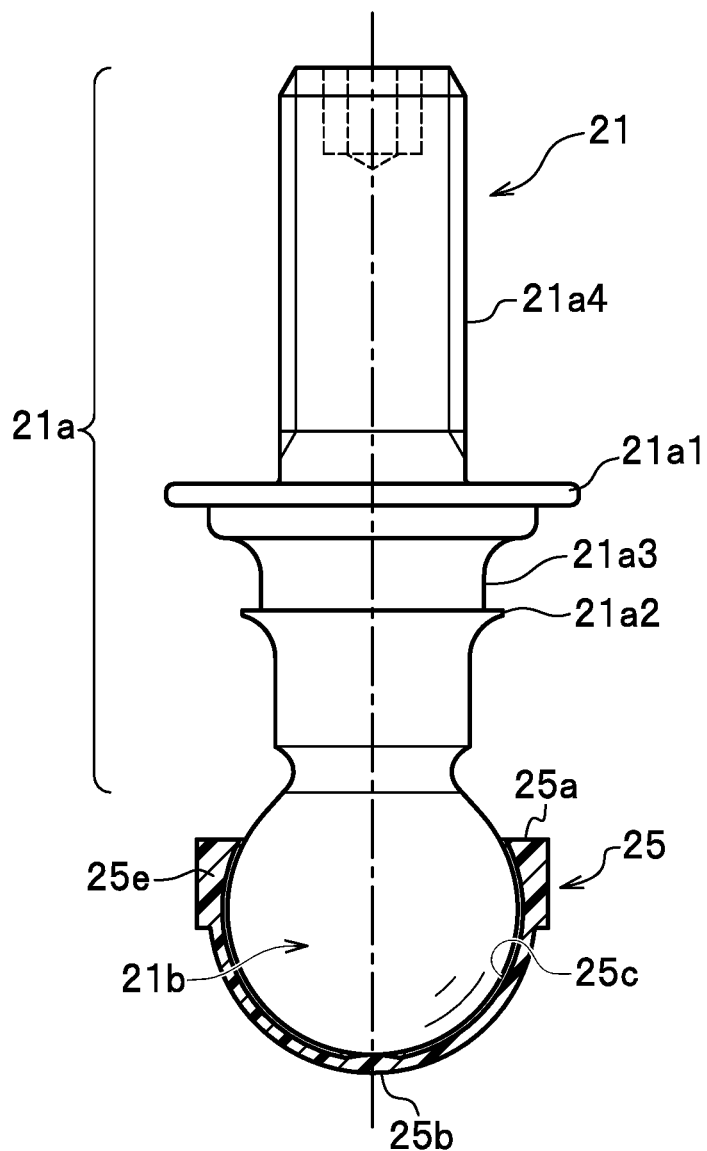
FIG. 3 is an external appearance diagram illustrating how a ball seat is attached to a ball part of a ball stud, and including a cross section of the ball seat.

Next, referring to FIGS. 2 and 3, descriptions will be provided for the ball joint 13 according to the embodiment of the present invention. FIG. 2 is a vertical cross-sectional diagram of the ball joint 13 according to the embodiment of the present invention. FIG. 3 is an external appearance diagram illustrating how a ball seat 25 is attached to a ball part 21b of the ball stud 21, and including a cross section of the ball seat 25.

As illustrated in FIGS. 2 and 3, the ball joint 13 includes the ball stud 21 made from a metal such as steel, and the housing 23 made from a resin. The ball stud 21 includes a stud part 21a in one end portion of the ball stud 21, and the ball part 21b in the other end portion of the ball stud 21. The stud part 21a and the ball part 21b are joined together by welding. The stud part 21a and the ball part 21b may be formed as an integral unit. The housing 23 is provided to each of the two ends of the support bar 11a, and has a configuration which make the housing 23 turnably support the ball part 21b of the corresponding ball stud 21.

The stud part 21a of the ball stud 21 includes a large flange part 21a1 and a small flange part 21a2 which are formed with a space in between. A circumferential recessed part 21a3 is formed between the large flange part 21a1 and the small flange part 21a2. A male thread part 21a4 is formed in a distal end-side portion of the stud part 21a from the large flange part 21a1 (an opposite side portion of the ball stud 21 from the ball part 21b).

A circular dust cover 27 made from an elastic body such as rubber is attached between an upper end portion of the housing 23 and the circumferential recessed part 21a3 of the stud part 21a in a way that covers the gap between the upper end portion thereof and the circumferential recessed part 21a3. The dust cover 27 fulfils a function of blocking rain water, dust and the like from entering the ball joint 13.

As illustrated in FIGS. 2 and 3, a hemispherical recessed part 23a is formed in an inner bottom portion of the housing 23 in order for the housing 23 to turnably support the ball part 21b of the ball stud 21. A circular projection-shaped flange 23b is formed in an upper portion of the housing 23. The projection-shaped flange 23b includes a taper part 23b1 in the shape of a conical surface which is in contact with an opening peripheral edge part 25a of the ball seat 25, and which extends outward. An inclination angle of the taper part 23b1 to an axis C is set at an appropriate value depending on a swing angle, a shaft diameter and so on of the ball stud 21.

As the resin material (corresponding to the "second resin" of the present invention) of the housing 23, for example, PA66-GF30 (PA66 with glass fiber added therein in a weight ratio of 30 to 50%/with a melting point of approximately 270 degrees Celsius) is preferably used with taken into consideration the necessity for the resin material to have thermal plasticity (since the housing is formed by injection molding), and to satisfy a predetermined strength requirement, as well as other necessities. Instead of PA66-GF30, however, an engineering plastic such as polyetheretherketone (PEEK), polyamide 66 (PA66), polyphenylene sulfide resin (PPS) or polyoxymethylene (POM), a super-engineering plastic, a fiber-reinforced plastic (FRP), a glass-reinforced plastic (GRP), a carbon fiber-reinforced plastic (CFRP), or the like may be used as the resin material of the housing 23 depending on the necessity.

As illustrated in FIGS. 2 and 3, the ball seat 25 made from resin is provided existing between the ball part 21b of the ball stud 21 and the hemispherical recessed part 23a of the housing 23. Incidentally, the resin-made ball seat 25 is manufactured by single injecting molding. This will be discussed in detail later. The ball stud 21 is swingably (see an arrow α1 in FIG. 1) and rotatably (see an arrow α2 in FIG. 1) supported by the housing 23 while a spherical outer circumferential surface of the ball part 21b held in the hemispherical recessed part 23a of the housing 23 is in contact with and slides over an inner circumferential surface of the ball seat 25. As discussed above, each suspension 15 is smoothly linked to the stabilizer 17 using the ball joints 13 included in the stabilizer link 11.

Ball Seat 25

Figure 4A:
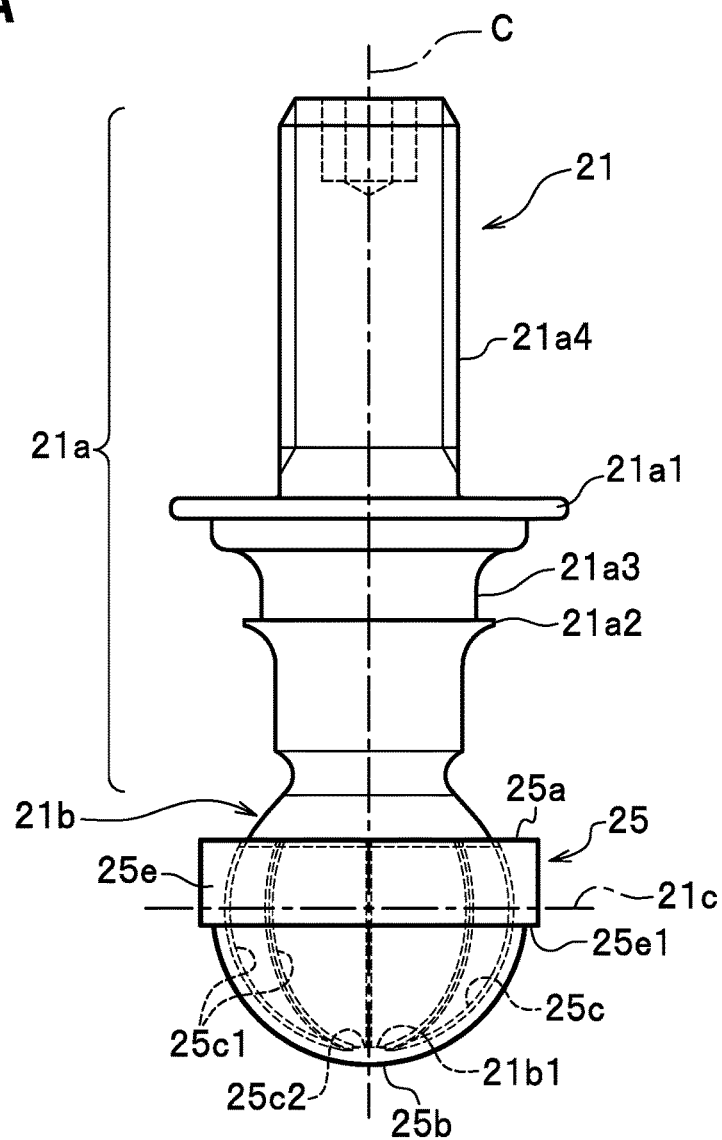
FIG. 4A is an external appearance diagram illustrating how the ball seat is attached to the ball part of the ball stud.
Figure 4B:
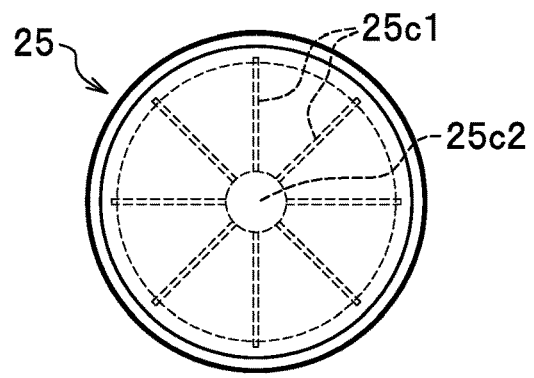
FIG. 4B is an external appearance diagram of a bottom view of the ball seat.
Figure 4C:
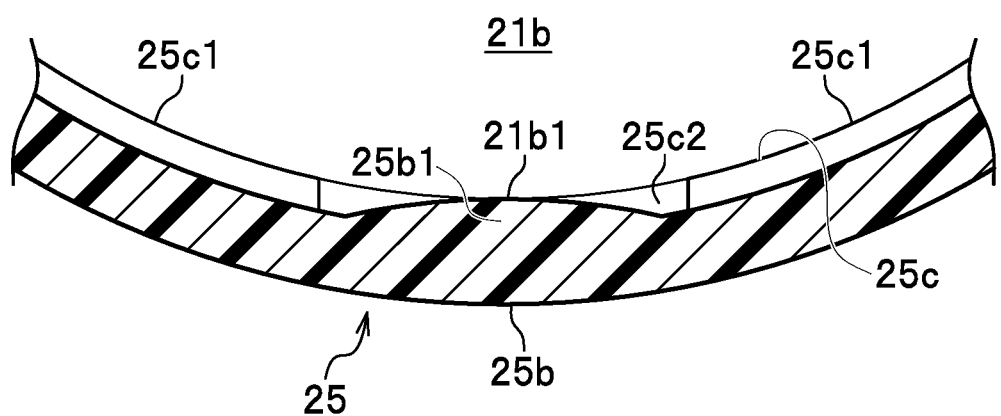
FIG. 4C is a magnified cross-sectional diagram of a lubricant chamber provided to a bottom part of the ball seat and the vicinity of the lubricant chamber.

Next, referring to FIGS. 4A to 4C, descriptions will be provided for a detailed structure of the ball seat 25. FIG. 4A is an external appearance diagram illustrating how the ball seat 25 is attached to the ball part 21b of the ball stud 21. FIG. 4B is an external appearance diagram of a bottom view of the ball seat 25 from a bottom part 25b. FIG. 4C is a magnified cross-sectional diagram of a lubricant chamber provided to the bottom part 25b of the ball seat 25, and the vicinity of the lubricant chamber.

As illustrated in FIG. 4A, the ball seat 25 includes an inner sphere part 25c formed of a spherical inner circumferential surface which covers more than half of the spherical outer circumferential surface of the ball part 21b of the ball stud 21. The inner sphere part 25c corresponds to a "holding part of the ball part" of the present invention.

It should be noted that the insert injection molding used to manufacture the stabilizer link 11 is performed with the ball joint 13 inserted in the mold, where: the ball joint 13 includes the ball stud 21; and the ball seat 25 is attached to the ball part 21b of the ball stud 21. In other words, the ball seat 25 is also exposed to the injecting temperature and the injection pressure of the second resin which is used in the insert injection molding, and from which the housing 23 is molded. The exposure of the ball seat 25 to the injection temperature and the injection pressure of the second resin involves possibility that: the ball seat 25 becomes soft; the softness resulting in deformation and crushing of the ball seat 25; and the deformation and crushing make it impossible for the ball joint to appropriately manage torque which causes the ball part 21b to slide over the housing 23.

In view of this, the ball joint 13 according to the embodiment of the present invention employs a configuration in which an inner sphere diameter of the inner sphere part (holding part) 25c (corresponding to an "inner diameter dimension of the holding part" of the present invention) of the ball seat 25 is set at a dimension greater enough to accommodate an amount of molding shrinkage of a first resin after the injection molding, and an amount of molding shrinkage of the second resin from which to mold the housing 23 after the insert injection molding, the amount of molding shrinkage depending on the injection temperature and the injection pressure of the second resin during the insert injection molding.

This makes it possible for the ball joint to properly keep the torque produced between the inner circumferential surface of the inner sphere part (holding part) 25c and the outer circumferential surface of the ball part 21b even if the inner sphere diameter of the inner sphere part (holding part) 25c of the ball seat 25 shrinks due to the molding shrinkage of the first resin after the injection molding, and the molding shrinkage of the second resin after the insert injection molding, the amount of molding shrinkage depending on the injection temperature and the injection pressure of the second resin.

Multiple groove parts 25c1 extending along meridians are provided to the inner sphere part (holding part) 25c of the ball seat 25. The multiple groove parts 25c1 are filled with lubricant such as grease in order to decrease frictional force produced between the spherical outer circumferential surface of the ball part 21b and the inner sphere part (holding part) 25c of the ball seat 25.

The multiple groove parts 25c1 are provided at equal intervals in an equatorial part 21c of the ball part 21b. In an example illustrated in FIG. 4A, a total of 8 groove parts 25c1 are provided. Incidentally, the equatorial part 21c of the ball part 21b means a circumferential portion of the ball part 21b around the axis C of the ball stud 21 where the diameter of the ball part 21b is largest. Although the dimensions of each groove part 25c1 are not specifically limited, for example, the width and depth of each groove part 25c1 are preferably 0.3 mm or less, and 0.3 mm or less, respectively, for the purpose of decreasing the degree of crushing of the groove part 25c1.

As illustrated in FIG. 4A, a lubricant chamber 25c2 formed of a recessed portion capable of containing lubricant is provided in an inner bottom portion of the ball seat 25, which is a bottom part 25b-side portion of the inner sphere part (holding part) 25c, and which faces an apex part 21b1 of the ball part 21b. A bulge part 25b1 capable of coming into contact with the apex part 21b1 of the ball part 21b is provided around a central portion of the lubricant chamber 25c2. This makes it possible for the lubricant chamber 25c2 to contain lubricant which remains after filled into the multiple groove parts 25c1, and to replenish the multiple groove parts 25c1 with lubricant depending on the necessity.

Furthermore, while the ball joint 13 is in normal operation, the bulge part 25b1 provided on the inner bottom portion of the ball seat 25 is always in contact with the apex part 21b1 of the ball part 21b. For this reason, even if a crushing phenomenon occurs around the ball seat 25, the bulge part 25b1 and the apex part 21b1 securely receive force working in the axial direction of the ball stud 21. An effect of preventing spread of the crushing phenomenon can be expected from the bulge part 25b1 and the apex part 21b1.

As illustrated in FIG. 4A, a flange part 25e is formed in the ball seat 25, and covers an area including the opening peripheral edge part 25a. The largest outer diameter dimension of the flange part 25e is set at a dimension greater than that of the ball part 21b. To put it specifically, for example, the largest outer diameter dimension of the flange part 25e is set at a dimension obtained by adding a predetermined dimension (for example, approximately 2 to 4 mm) to the largest outer diameter dimension (sphere diameter) of the ball part 21b. Thus, the flange part 25e plays a role as a receiving portion for receiving a pulling force which is applied to the ball seat 25 manufactured by injection molding when a sphere part 31b of a male mold 31 (see FIG. 5C) is forcibly pulled out of an accommodating space (inclusive of its overhanging portion) for accommodating the ball part 21b in the ball seat 25.

A peripheral end edge 25e1 of the flange part 25e on the side of the apex part 21b1 of the ball part 21b extends vertically from the opening peripheral edge part 25a at least to a position which makes the peripheral end edge 25e1 cover the equatorial part 21c of the ball part 21b. This makes it possible to inhibit buckling deformation of the ball seat 25 which is likely to occur when the sphere part 31b of the male mold 31 is forcibly pulled out of the inner sphere part (holding part) 25c (inclusive of its portion overhanging the ball part 21b) of the ball seat 25 manufactured by injection molding.

An inner diameter dimension of the opening peripheral edge part 25a of the ball seat 25 is set at a dimension less than the largest outer diameter dimension of the ball part 21b. To put it specifically, the inner diameter dimension of the opening peripheral edge part 25a is set at a value obtained by multiplying the largest outer diameter dimension (sphere diameter) of the ball part 21b by a predetermined coefficient (0.90 to 0.98). In other words, the opening peripheral edge part 25a of the ball seat 25 has a configuration in which the opening peripheral edge part 25a overhangs the ball part 21b. This makes it possible for the ball seat 25 to hold the ball part 21b of the ball stud 21 while securely covering the periphery of the ball part 21b.

Although not specifically limited, the thickness of the opening peripheral edge part 25a overhanging the ball part 21b is set at, for example, a value of approximately 0.35 to 1.0 mm for the purpose of inhibiting the opening peripheral edge part 25a from being plastically deformed when the male mold 31 (see FIG. 5A and the like) is forcibly pulled out of the ball seat 25 after the injection molding, and when the ball part 21b is forcibly pulled into the ball seat 25.

As the resin material (corresponding to the "first resin" of the present invention) of the ball seat 25, for example, polybutylene terephthalate (PBT with a melting point of approximately 230 degrees Celsius), polyamide 46 (PA46 with a melting point of approximately 270 degrees Celsius), polyetheretherketone (PEEK with a melting point of approximately 340 degrees Celsius) or the like is preferably used with taken into consideration the necessity for the resin material to have thermal plasticity (since the ball seat 25 is formed by injection molding), to satisfy a predetermined friction durability requirement, and to have a melding point equal to or greater than that (for example, approximately 270 degrees Celsius) of the resin material from which to mold the housing 23.

The reason why a resin material having a melting point equal to or greater than that of the resin material from which to mold the housing 23 is selected as the resin material from which to mold the ball seat 25 is that such a selected resin material can inhibit the ball seat 25 from becoming soft and thus deformed and crushed. Accordingly, the stabilizer link 11 according to the embodiment of the present invention is manufactured by the insert injection molding.

This insert injection molding is performed with the ball joint 13 inserted in the mold, where: the ball joint 13 includes the ball stud 21; and the ball seat 25 is attached to the ball part 21b of the ball stud 21. In other words, the ball seat 25 is also exposed to the injection temperature and the injection pressure of the second resin which is used in the insert injection molding, and from which the housing 23 is molded. In this case, the exposure of the ball seat 25 to the injection temperature and the injection pressure of the second resin involves possibility that: the ball seat 25 becomes soft; the softness results in deformation and crushing of the ball seat 25; and the deformation and crushing make it impossible for the ball joint to appropriately manage torque which causes the ball part 21b to slide over the housing 23.

In contrast, in the case where a resin material having a melting point equal to or greater than that (for example, approximately 270 degrees Celsius) of the resin material (second resin) from which to mold the housing 23 is employed as the resin material (first resin) of the ball seat 25, the ball seat 25 can be inhibited from becoming soft and thus deformed and crushed.

Instead of PBT, PA46 and PEEK, however, an engineering plastic such as polyamide 66 (PA66), polyamide 6 (PA6), polyphenylene sulfide resin (PPS) or polyoxymethylene (POM), a super-engineering plastic, a fiber-reinforced plastic (FRP), a glass-reinforced plastic (GRP), a carbon fiber-reinforced plastic (CFRP), or the like may be used as the resin material of the housing 23 depending on the necessity.

The thickness of the ball seat 25 (but excluding an area where the groove parts 25c1 exist) is selected from, for example, a dimension ranged of 0.4 mm to 2.0 mm, inclusive, depending on the necessity. This is based on likelihood that: when the thickness of the ball seat 25 is less than 0.4 mm, the fluidity of the resin is poor during the injection molding; and when the thickness of the ball seat 32 is greater than 2.0 mm, an amount of movement of the ball stud 21 is larger than otherwise (since the resin material of the ball seat 25 is elastic), and the elastic lift is also larger than otherwise.

Step of Manufacturing Ball Seat 25

Figure 5A:
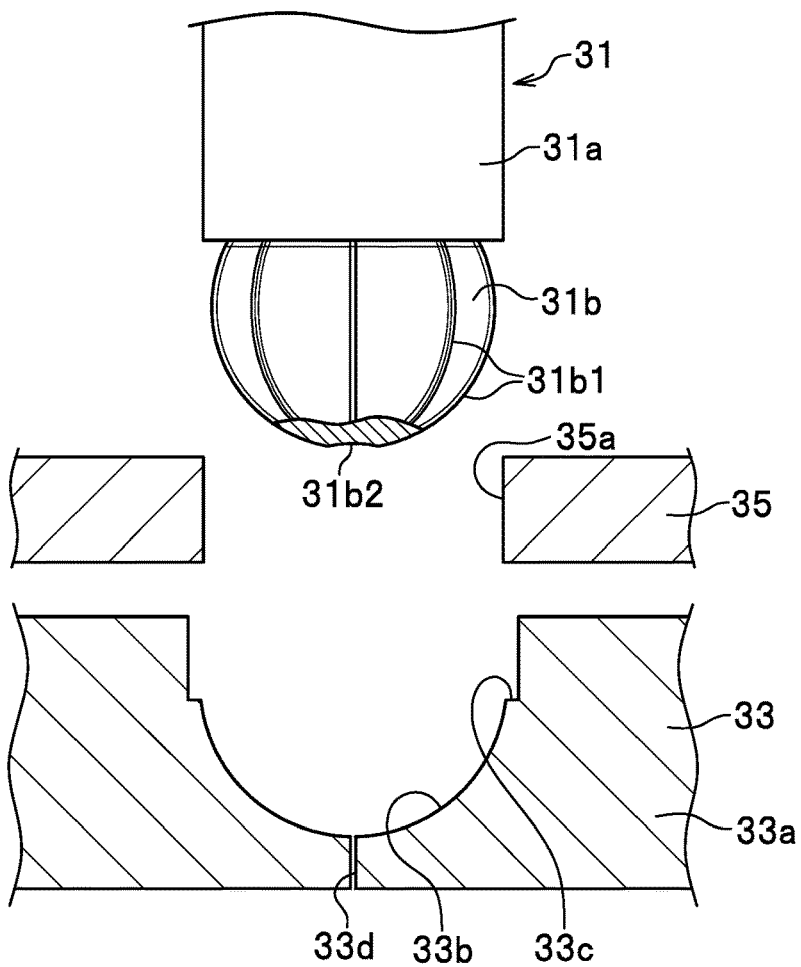
FIG. 5A is an explanatory diagram illustrating a configuration of a split mold to be used for a step of manufacturing the ball seat by injection molding.
Figure 5B:
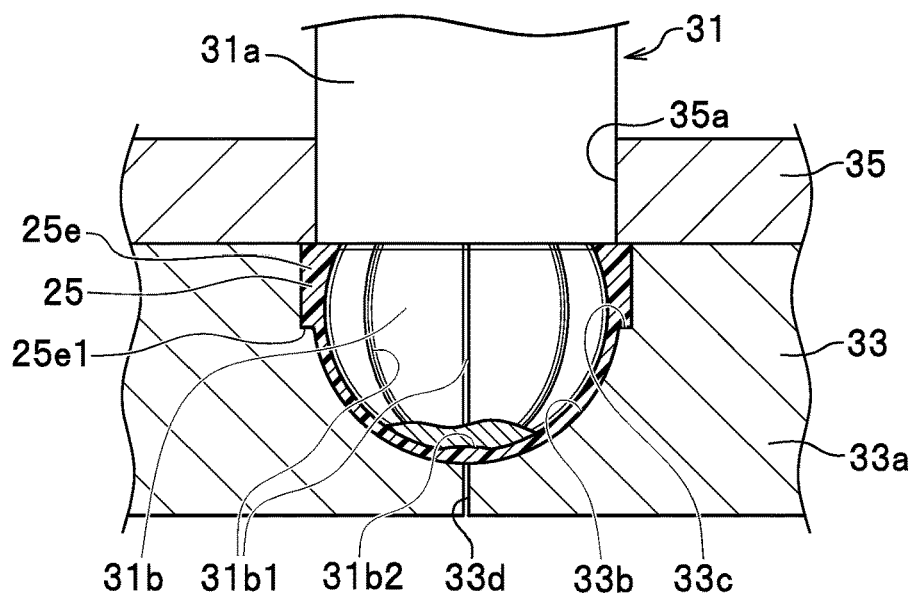
FIG. 5B is an explanatory diagram illustrating the step of manufacturing the ball seat by injection molding using the split mold.
Figure 5C:
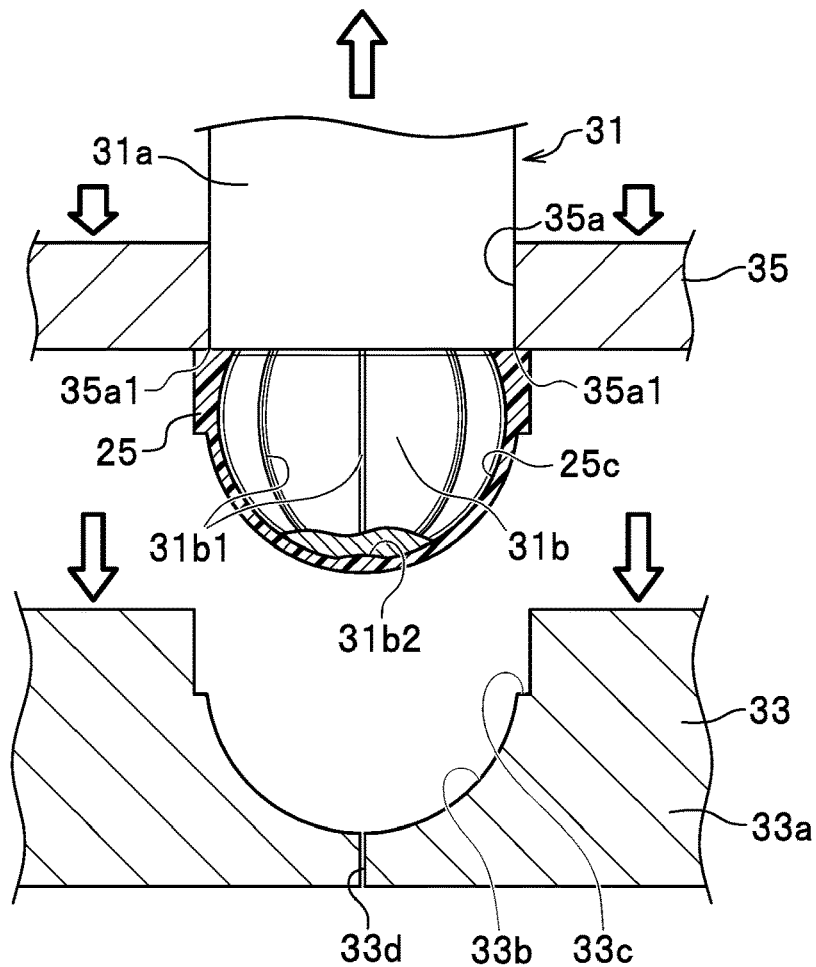
FIG. 5C is an explanatory diagram illustrating a step of sequentially removing a female mold and a male mold from the ball seat manufactured by injecting molding.
Figure 5D:
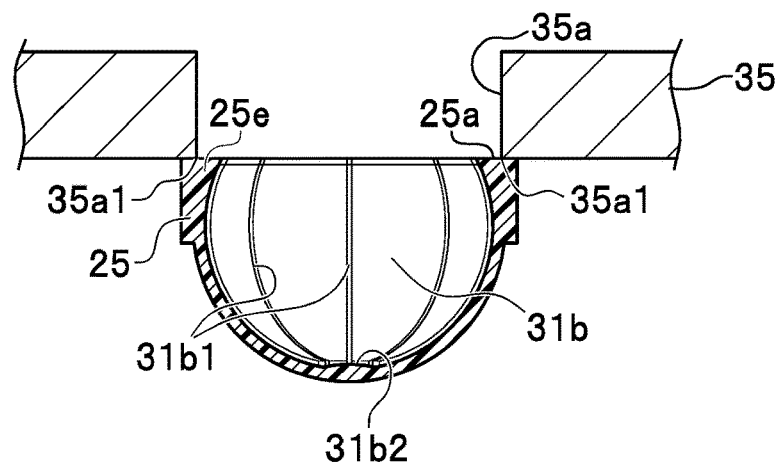
FIG. 5D is an explanatory diagram illustrating the ball seat from which the male mold has been just removed, together with the mold.
Figure 5E:
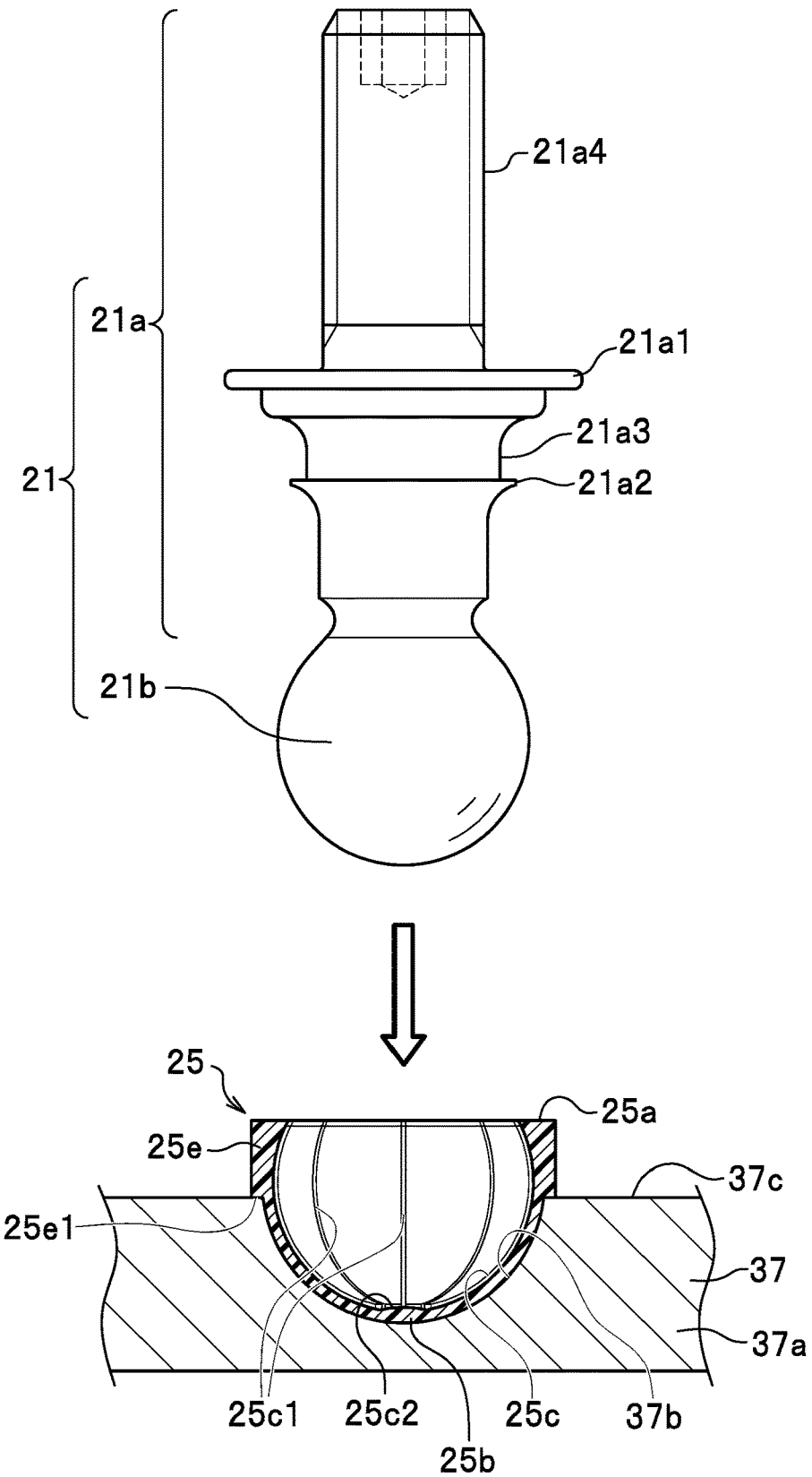
FIG. 5E is an external appearance diagram illustrating a step of attaching the ball seat to the ball part of the ball stud, together with the cross section of the ball seat.

Next, referring to FIGS. 5A to 5E, descriptions will be provided for a step of manufacturing the ball seat 25. FIG. 5A is an explanatory diagram illustrating a configuration of a split mold to be used for the step of manufacturing the ball seat 25 by injection molding. FIG. 5B is an explanatory diagram illustrating the step of manufacturing the ball seat 25 by injection molding using the split mold. FIG. 5C is an explanatory diagram illustrating a step of sequentially removing a female mold and the male mold from the ball seat 25 manufactured by injecting molding. FIG. 5D is an explanatory diagram illustrating the ball seat 25 which has been just removed from the male mold, together with the mold. FIG. 5E is an external appearance diagram illustrating a step of attaching the ball seat 25 to the ball part 21b of the ball stud 21b, together with the cross section of the ball seat 25.

Before discussing the step of manufacturing the ball seat 25 by injection molding, descriptions will be provided for the configuration of the split mold to be used for the manufacturing step with reference to FIG. 5A.

As illustrated in FIG. 5A, the split mold made from a steel material, and used for the step of manufacturing the ball seat 25 includes the male mold 31, the female mold 33, and an ejection plate 33 for securing the sealing between the male mold 31 and the female mold 33 by being brought into contact with the male mold 31 and the female mold 33. The male mold 31, the female mold 33 and an ejection plate 35 jointly correspond to a "first mold" of the present invention.

The male mold 31 is formed by joining the spherical sphere part 31b to an end of a columnar bar part 31a. The sphere part 31b of the male mold 31 corresponds to the inner sphere part (holding part) 25c of the ball seat 25. In this respect, an outer diameter dimension of the sphere part 31b of the male mold 31 (corresponding to the inner diameter dimension of inner sphere part (holding part) 25c of the ball seat 25) is set at a dimension greater enough to accommodate the amount of molding shrinkage of the first resin after the injection molding, and the amount of molding shrinkage of the second resin after the insert injection molding, the amount of molding shrinkage depending on the injection temperature and the injection pressure of the second resin during the insert injection molding.

As illustrated in FIG. 5A, multiple projecting parts 31b1 extending along the meridians from the bottom part of the sphere part 31b of the male mold 31 are projectively provided to an outer circumferential surface of the sphere part 31b. The multiple projecting parts 31b1 correspond to the groove parts 25c1 formed in the inner sphere part (holding part) 25c of the ball seat 25. Projecting and recessed parts 31b2 are provided to the bottom part of the sphere part 31b. Of the projecting and recessed parts 31b2, the recessed part corresponds to the bulge part 25b1 provided on the inner bottom portion of the ball seat 25, while the projecting part corresponds to the lubricant chamber 25c2 formed of the recessed portion.

As illustrated in FIG. 5A, the female mold 33 includes an inner sphere part 33b which is drilled in the center of a columnar base body part 33a, and which has an inner circumferential surface to face the outer circumferential surface of the spherical sphere part 31b. The inner sphere part 33b of the female mold 33 corresponds to an outer circumferential surface of the ball seat. 25. As illustrated in FIG. 5A, in the base body part 33a, a circular step part 33c is formed above the inner sphere part 33b. The circular step part 33c corresponds to the peripheral end edge 25e1 of the flange part 25e included in the ball seat 25 (see FIG. 4A). As illustrated in FIG. 5A, in the base body part 33a, an injection passage 33d used to inject the first resin from which to mold the ball seat 25 is opened in the bottom portion of the inner sphere part 33b.

An opening part 35a is opened in the ejection plate 35. The opening part 35a tightly receives the columnar bar part 31a included in the male mold 31 and allows the columnar bar part 31a to penetrate through the opening part 35a.

As illustrated in FIG. 5B, the manufacturing of the ball seat 25 using the male mold 31, the female mold 33 and the ejection plate 35 is achieved by: placing the male mold 31, the female mold 33 and the ejection plate 35 at their respective predetermined positions; and performing an injection molding process of injecting the first resin from which to mold the ball seat 25 via the injection passage 33d with the male mold 31, the female mold 33 and the ejection plate 35 clamped using a clamping member (not illustrated).

Through this injection molding process, a molded product as the ball seat 25 is manufactured.

Next, as illustrated in FIG. 5C, a pulling step is performed in which: the female mold 33 is pull downward (see arrows in FIG. 5C) and detached from the ball seat 25 manufactured by the injection molding process; and thereafter, the sphere part 31b of the male mold 31 is forcibly pull out of the inner sphere part (holding part) 25c (including the overhanging portion) of the ball seat 25.

As illustrated in FIG. 5C, the step of forcibly pulling the sphere part 31b of the male mold 31 out of the inner sphere part (holding part) 25c of the ball seat 25 is achieved by applying an upward force (see an arrow in FIG. 5C) to the male mold 31 with the upper end portion of the flange part 25e in the molded product as the ball seat 25 held by an opening circumferential end edge 35a1 of the ejection plate 35. In this respect, the opening circumferential end edge 35a1 of the ejection plate 35 is located outward of a portion of the upper end portion of the flange part 25e which corresponds to the largest outer diameter dimension of the sphere part 31b (the sphere diameter of the sphere part 31b) of the male mold 31. The reason for this is as follows. If the opening circumferential end edge 35a1 of the ejection plate 35 is located inward of the portion of the upper end portion of the flange part 25e which corresponds to the largest outer diameter dimension of the sphere part 31b (the sphere diameter of the sphere part 31b) of the male mold 31, the outer circumferential portion of the sphere part 31b of the male mold 31 interfere in the opening circumferential end edge 35a1 when the sphere part 31b of the male mold 31 is forcibly pulled out of the inner sphere part (holding part) 25c of the ball seat 25. This makes it difficult to forcibly pull the sphere part 31b out of the inner sphere part (holding part) 25c smoothly.

FIG. 5D illustrates a molded product which is obtained as the ball seat 25 immediately after the sphere part 31b of the male mold 31 is forcibly pulled out of the inner sphere part (holding part) 25c of the ball seat 25, together with the ejection plate 35.

Next, as illustrated in FIG. 5E, an attachment step is performed in which the ball seat 25 is attached to the ball part 21b of the ball stud 21 by making a force for pushing the ball part 21b of the ball stud 21 into the inner sphere part (holding part) 25c of the ball seat 25 act on the molded product as the ball seat 25.

In the attachment step, a jig 37 illustrated in FIG. 5E is used to support the molded product as the ball seat 25. As illustrated in FIG. 5E, the jig 37 includes an inner sphere part 37b which is drilled in the center of a columnar base body part 37a, and which has an inner circumferential surface to face the outer circumferential surface of the ball seat 25. As illustrated in FIG. 5E, the peripheral end edge 25e1 of the flange part 25e formed in the ball seat 25 is brought into contact with an upper end part 37c of the base body part 37a. When the molded product as the ball seat 25 is supported by the jig 37, no metal member restricts the outer circumference of the flange part 25e. Thus, when the force for pushing the ball part 21b of the ball stud 21 into the inner sphere part (holding part) 25c of the ball seat 25 is made to act on the molded product as the ball seat 25, the opening peripheral edge part 25a of the ball seat 25 opens wider to the outside. Thereby, the attachment step can be performed smoothly.

Working and Effects of Ball Joint 13 According to the Embodiment of the Present Invention Next, descriptions will be provided for working and effects of the ball joint 13 according to the embodiment of the present invention.

The ball joint 13 according to the present invention (1) is the ball joint 13 which includes: the ball stud 21 fastened at one end to the suspension 15, and including the ball part 21b at an opposite end; the housing 23 turnably supporting the ball part 21b of the ball stud 21; and the ball seat 25 provided existing between the housing 23 and the ball part 21b, and including the holding part (the inner sphere part 25c) for the ball part 21b. The ball seat 25 is formed by single injection molding where the thermoplastic first resin (from which to mold the ball seat 25) is injected into the first mold, and is provided in the housing 23 by insert injection molding where the thermoplastic second resin (from which to mold the housing 23) is injected into the second mold with the ball seat 25 inserted in the second mold while the ball part 21b is being held in the inner sphere part 25c of the ball seat 25. The inner diameter dimension of the inner sphere part (holding part) 25c formed in the ball seat 25 by the injection molding is set at the dimension greater enough to accommodate the amount of molding shrinkage of the first resin after the injection molding, and the amount of molding shrinkage of the second resin after the insert injection molding, the amount of the molding shrinkage depending on the injection temperature and the injection pressure of the second resin during the insert injection molding.

In the ball joint according to the present invention (1), the inner diameter dimension of the inner sphere part (holding part) 25c formed in the ball seat 25 by the injection molding is set at the dimension greater enough to accommodate the amount of molding shrinkage of the first resin after the injection molding, and the amount of molding shrinkage of the second resin after the insert injection molding, the amount of molding shrinkage depending on the injection temperature and the injection pressure of the second resin during the insert injection molding. For this reason, if the inner diameter dimension of the inner sphere part (holding part) 25c included in the ball seat 25 shrinks because of the molding shrinkage of the first resin after the injection molding, and the molding shrinkage of the second resin after the insert injection molding, the amount of molding shrinkage depending on the injection temperature and the injection pressure of the second resin, the torque produced between the inner circumferential surface of the inner sphere part (holding part) 25c and the outer circumferential surface of the ball part 21b can be appropriately managed.

The ball joint 13 according to the present invention (1) can appropriately manage the torque which causes the ball part 21b to slide over the housing 23, even in the case where the ball seat 25 is provided in the housing 23 by the insert injection molding where the resin is injected into the second mold with the ball seat 25 inserted in the second mold while the ball part 21b of the ball stud 21 is being held in the ball seat 25.

In addition, the ball joint 13 according to the present invention (2) is the ball joint 13 according to the present invention (1), which may employ the configuration where the material having the melting property which enables the material to withstand the effects of the injection temperature and the injection pressure of the second resin during the insert injection molding is selected as the first resin from which to mold the ball seat 25 to be formed by the injection molding.

In the ball joint 13 according to the present invention (2), the material having the melting property which enables the material withstand the effects of the injection temperature and the injection pressure of the second resin during the insert injection molding is selected as the first resin from which to mold the ball seat 25 to be formed by the injection molding. For this reason, even if the injection temperature and the injection pressure of the second resin affects the ball seat 25, the ball seat 25 can be inhibited from becoming soft, and the torque produced between the inner circumferential surface of the inner sphere part (holding part) 25c and the outer circumferential surface of the ball part 21b can be appropriately managed.

The ball joint 13 according to the present invention (2) can more appropriately manage the torque which causes the ball part 21b to slide over the housing 23 than the ball joint 13 according to the present invention (1).

Furthermore, the ball joint 13 according to the present invention (3) is the ball joint 13 according to the present invention (1) or (2), which may employ the configuration where: the ball seat 25 covers at least more than half of the ball part including the area stretching between the apex part 21b1 (see FIG. 4C) and the equatorial part 21c (see FIG. 4A) of the ball part 21b; the flange part 25e is formed throughout the area of the ball seat 25 which includes the opening peripheral edge part 25a; the inner diameter dimension of the opening peripheral edge part 25a is set at the dimension less than the largest outer diameter dimension of the ball part 21b; the largest outer diameter dimension of the flange part 25e is set at the dimension greater than the largest outer diameter dimension of the ball part 21b; and the peripheral end edge 25e1 of the flange part 25e on the side of the apex part 21b1 of the ball part 21b extends vertically at least to the position where the peripheral end edge 25e1 covers the equatorial part 21c of the ball part 21b.

In the ball joint 13 according to the present invention (3), the ball seat 25 covers at least more than half of the ball part 21b including the area stretching between the apex part 21b1 and the equatorial part 21c of the ball part 21b; the opening peripheral edge part 25a of the ball seat 25 has the configuration which makes the opening peripheral edge part 25a overhang the ball part 21b; and the peripheral end edge 25e1 of the flange part 25e on the side of the apex part 21b1 of the ball part 21b extends vertically at least to the position where the peripheral end edge 25e1 covers the equatorial part 21c of the ball part 21b. The ball seat 25, therefore, can securely hold the ball part 21b of the ball stud 21 by surrounding the circumference of the ball part 21b.

The ball joint 13 according to the present invention (3) enables the ball part 21b to smoothly slide over the housing 23 with the ball seat 25 interposed in between in addition of providing the same working and effects as the ball joint according to the present invention (1) or (2).

Moreover, the ball joint 13 according to the present invention (4) is the ball joint 13 according to any one of the present inventions (1) to (3), which may employ the configuration where the groove parts extending along the meridians of the ball part 21b are provided to the inner circumferential surface of the inner sphere part (holding part) 25c of the ball seat 25, the inner circumferential surface facing the ball part 21b.

In the ball joint 13 according to the present invention (4), the groove parts 25c1 extending along the meridians of the ball part 21b is provided to the inner circumferential surface of the inner sphere part (holding part) 25c of the ball seat 25, the inner circumferential surface facing the ball part 21b. The ball joint 13 according to the present invention (4), therefore, enables the ball part 21b to smoothly slide over the housing 23 with the ball seat 25 interposed in between by filling the lubricant such as grease into the groove parts 25c1.

The ball joint 13 according to the present invention (4) enables the ball part 21b to more smoothly slide over the housing 23 with the ball seat 25 interposed in between than the ball joint 13 according to the present invention (3).

Besides, the ball joint 13 according to the present invention (5) is the ball joint 13 according to the present invention (4), which may employ the configuration where the lubricant chamber 25c2 formed of the recessed portion capable of containing the lubricant is provided to the inner bottom portion of the inner sphere part (holding part) 25c of the ball seat 25, the inner bottom portion facing the apex part 21b1 of the ball part 21b.

In the ball joint 13 according to the present invention (5), the lubricant chamber 25c2 formed of the recessed portion capable of containing the lubricant is provided to the inner bottom portion of the inner sphere part 25c of the ball seat 25, the inner bottom portion facing the apex part 21b1 of the ball part 21b. The ball joint 13 according to the present invention (5), therefore, can contain the lubricant which remains after filled into the groove parts 25c1, and replenish the groove parts 25c1 with the lubricant depending on the necessity.

The ball joint 13 according to the present invention (5) can be expected to exert the effect of making the ball part 21b much more smoothly slide over the housing 23 with the ball seat 25 interposed in between than the ball joint 13 according to the present invention (4).

In addition, the ball joint 13 according to the present invention (6) is the ball joint 13 according to the present invention (5), which may employ the configuration where the bulge part 25b1 capable of coming into contact with the apex part 21b1 of the ball part 21b is provided around the central portion of the lubricant chamber 25c2.

In the ball joint according to the present invention (6), the bulge part 25b1 capable of coming into contact with the apex part 21b1 of the ball part 21b is provided around the central portion of the lubricant chamber 25c2. The ball joint 13 according to the present invention (6), therefore, can facilitate the effect of replenishing the groove part 25c1 with the lubricant which is contained in the lubricant chamber 25c2 by allowing the ball part 21b to turn with the apex part 21b1 of the ball part 21b in contact with the bulge part 25b1.

The ball joint according to the present invention (6) can be expected to exert the effect of making the ball part 21b far more smoothly slide over the housing 23 with the ball seat 25 interposed in between than the ball joint 13 according to the present invention (5).

Furthermore, the stabilizer link 11 according to the present invention (7) is the stabilizer link 11, provided in the vehicle including the suspension 15 and the stabilizer 17, for linking the suspension 15 and the stabilizer 17 together, which may employ the configuration where the stabilizer link 11 includes the ball joint 13 according to anyone of the present inventions (1) to (6) which is provided to at least one longitudinal end portion of the bar-shaped support bar.

The stabilizer link 11 according to the present invention (7) can realize the stabilizer link 11 which brings about the working and effects of the ball joint 13 according to any one of the present inventions (1) to (6).

Other Embodiments

The above-discussed embodiments just show examples of how the present invention is embodied. For this reason, the interpretation of the technical scope of the present invention shall not be limited using these embodiments. This is because the present invention can be carried out in various modes without departing from its gist or main features.

Although the ball joint 13 according to the present invention has been described using the example where the ball joint 13 is applied to the stabilizer link 11 in the vehicle, the present invention is not limited to this example. The ball joint 13 according to the present invention is widely applicable to structures of joint parts in arms included in industrial robots, and joint parts in arms included in industrial vehicles such excavators and crane vehicles.

REFERENCE SIGNS LIST 11 stabilizer link
13 ball joint
15 suspension (structure body)
17 stabilizer (structure body)
21 ball stud
21b ball part
21c equatorial part
23 housing
25 ball seat
25c inner sphere part (holding part for holding ball part)
25e flange part

The invention claimed is:

1. A ball joint comprising:
a ball stud fastened at one end to a structure body, and including a ball part at an opposite end;
a housing turnably supporting the ball part of the ball stud; and
a ball seat provided existing between the housing and the ball part, and including a holding part for the ball part, wherein:
the ball seat is formed by injection molding where a thermoplastic first resin is injected into a first mold, and is provided in the housing by insert injection molding where a thermoplastic second resin from which to mold the housing is injected into a second mold with the ball seat inserted in the second mold while the ball part is being held in the holding part of the ball seat, and
an inner diameter dimension of the holding part formed in the ball seat by the injection molding configured to accommodate an amount of first molding shrinkage of the first resin after the insert injection molding and an amount of second molding shrinkage of the second resin after the insert injection molding, the amount of second molding shrinkage depending on an injection temperature and an injection pressure of the second resin during the insert injection molding, wherein
the ball seat covers at least more than half of the ball part including an area stretching between an apex part and an equatorial part of the ball part,
an outer surface of the ball seat which covers the area stretching between the apex part and the equatorial part of the ball part has a spherical part which is formed along the area of the ball part;
a flange part is formed around an area of the ball seat including an opening peripheral edge part, the flange part having an outer side surface formed in a cylindrical shape;
a thickness of the flange part is formed to be greater than that of the spherical part of the ball seat;
an inner diameter dimension of the opening peripheral edge part is set at a dimension less than the largest outer diameter dimension of the ball part;

the largest outer diameter dimension of the flange part is set at a dimension greater than the largest outer dimension of the ball part; and a peripheral end edge of the flange part on a side of the apex part of the ball part extends vertically at least to a position of the ball seat which covers the equatorial part of the ball part.

2. The ball joint according to claim 1, wherein a material having a melting property which enables the material to withstand effects of the injection temperature and the injection pressure of the second resin during the insert injection molding is selected as the first resin from which to mold the ball seat to be formed by the injection molding.

3. The ball joint according to claim 1, wherein a groove part extending along a meridian of the ball part is provided to an inner circumferential surface of the holding part of the ball seat, the inner circumferential surface facing the ball part.

4. The ball joint according to claim 3, wherein a lubricant chamber formed of a recessed portion capable of containing lubricant is provided to an inner bottom portion of the holding part of the ball seat, the inner bottom portion facing an apex part of the ball part.

5. The ball joint according to claim 4, wherein a bulge part capable of coming into contact with the apex part of the ball part is provided around a central portion of the lubricant chamber.

6. A stabilizer link, provided in a vehicle including a suspension and a stabilizer, for linking the suspension and the stabilizer together, comprising the ball joint according to claim 1 which is provided to at least one longitudinal end portion of a bar-shaped support bar.

* * * * *